US008442663B2

(12) United States Patent
Aneweer et al.

(10) Patent No.: US 8,442,663 B2
(45) Date of Patent: May 14, 2013

(54) METHODS, APPARATUS AND ARTICLES OF MANUFACTURE TO TEST PROCESS CONTROL SYSTEMS

(75) Inventors: Tom Aneweer, Georgetown, TX (US); Dirk Thiele, Austin, TX (US); Noel Bell, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 194 days.

(21) Appl. No.: 12/861,515

(22) Filed: Aug. 23, 2010

(65) Prior Publication Data

US 2012/0046764 A1     Feb. 23, 2012

(51) Int. Cl.
*G06F 19/00*     (2011.01)
(52) U.S. Cl.
USPC ............................................. 700/97; 700/110
(58) Field of Classification Search .................. 700/79, 700/108–110, 169
See application file for complete search history.

(56) References Cited

U.S. PATENT DOCUMENTS

| | | | | |
|---|---|---|---|---|
| 4,985,824 A * | 1/1991 | Husseiny et al. | ............... | 700/82 |
| 5,761,518 A | 6/1998 | Boehling et al. | | |
| 6,487,126 B1 * | 11/2002 | Kawahara | ................ | 365/189.05 |
| 6,721,609 B1 * | 4/2004 | Wojsznis et al. | ................ | 700/28 |
| 7,289,861 B2 * | 10/2007 | Aneweer et al. | ............. | 700/110 |
| 7,684,875 B2 * | 3/2010 | Jundt et al. | ....................... | 700/19 |
| 8,135,481 B2 * | 3/2012 | Blevins et al. | .................. | 700/51 |
| 2004/0158713 A1 * | 8/2004 | Aneweer et al. | ............. | 713/166 |

FOREIGN PATENT DOCUMENTS

| | | |
|---|---|---|
| JP | 2003316433 | 4/2002 |
| WO | WO2011110649 | 9/2011 |

OTHER PUBLICATIONS

Emerson Process Management, "DeltaV Event Chronicle," Whitepaper, DeltaV Event Chronicle, Feb. 2009 (29 pages).
Emerson Process Management, "DeltaV Continuous Historian," DeltaV Product Data Sheet, Sep. 2009 (10 pages).
Emerson Process Management, "DeltaV OPC Xi Server," DeltaV Product Data Sheet, Jan. 2010 (7 pages).
Emerson Process Management, "DeltaV OPC Events Server," DeltaV Product Data Sheet, Sep. 2009 (3 pages).
Emerson Process Management, "DeltaV OPC History Server," DeltaV Product Data Sheet, Sep. 2009 (6 pages).
Emerson Process Management, "DeltaV Simulate," DeltaV Product Data Sheet, Apr. 2010 (9 pages).
Emerson Process Management, "DeltaV Virtual CHARMS IO Simulation," DeltaV Product Data Sheet, Apr. 2010 (3 pages).
Intellectual Property Office, "Patents Act 1977: Search Report under Section 17(5)", issued in connection with Great Britain Application No. GB1113567.0, Dec. 12, 2011, (3 pages).

* cited by examiner

*Primary Examiner* — Kidest Bahta
(74) *Attorney, Agent, or Firm* — Hanley, Flight & Zimmerman, LLC

(57) ABSTRACT

Example methods, apparatus and articles of manufacture to test process control systems are disclosed. A disclosed example method includes obtaining user inputs to a first process control system, obtaining process inputs and first process outputs of the first process control system, providing the user inputs and the process inputs to a second process control system to operate the second process control system, obtaining second process outputs of the second process control system operated with the user inputs and the process inputs, and comparing the first and second process outputs to determine whether the second process control system is implemented as intended.

20 Claims, 6 Drawing Sheets

METHODS, APPARATUS AND ARTICLES OF MANUFACTURE TO TEST PROCESS CONTROL SYSTEMS

FIELD OF THE DISCLOSURE

This disclosure relates generally to process control systems, and, more particularly, to methods, apparatus and articles of manufacture to test process control systems.

BACKGROUND

During the life cycle of a process plant, a process control system may need to be replaced, fixed, patched, upgraded, etc. However, any change of a process control system has the potential to disrupt operation of the process plant.

SUMMARY

Example methods, apparatus and articles to test process control systems are disclosed. A disclosed example method includes obtaining user inputs to a first process control system, obtaining process inputs and first process outputs of the first process control system, providing the user inputs and the process inputs to a second process control system to operate the second process control system, obtaining second process outputs of the second process control system operated with the user inputs and the process inputs, and comparing the first and second process outputs to determine whether the second process control system is implemented as intended.

Disclosed example machine-readable instructions, when executed, cause a processor to obtain user inputs to a first process control system, obtain process inputs and first process outputs of the first process control system, provide the user inputs and the process inputs to a second process control system to operate the second process control system, obtain second process outputs of the second process control system operated with the user inputs and the process inputs, provide the user inputs and the process inputs to a third process control system to operate the third process control system, obtain third process outputs of the third process control system operated with the user inputs and the process inputs, and compare the second and third process outputs to determine whether the third process control system is implemented as intended.

A disclosed example apparatus includes a data collector to obtain user inputs, process inputs and first process outputs of a first process control system and obtain second process outputs of a second process control system, a replayer to provide the user inputs and the process inputs to the second process control system to operate the second process control system, and a comparer to compare the first and second process outputs to determine whether the second process control system operated as intended.

DETAILED DESCRIPTION

Figure 1:
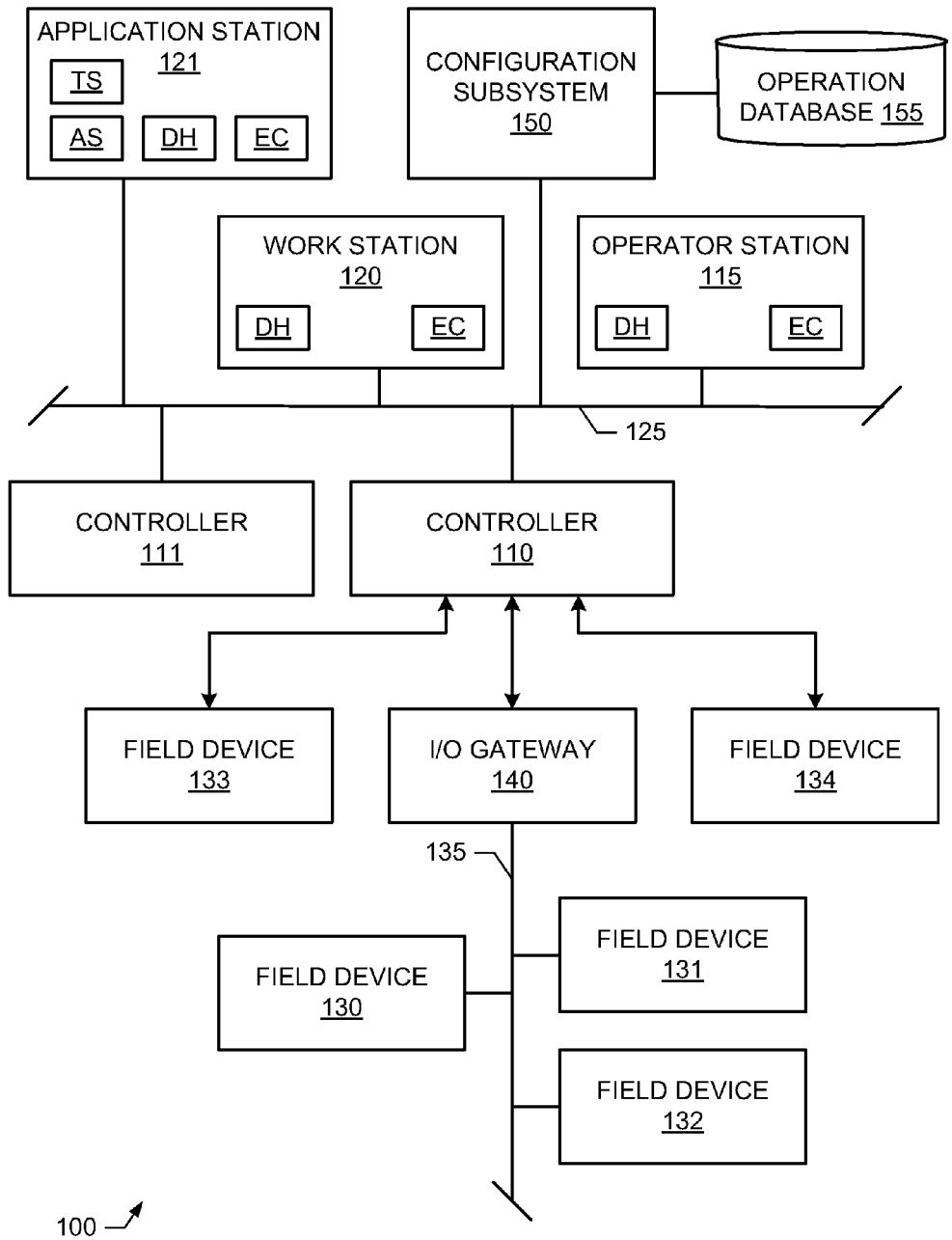
FIGS. 1, 2 and 3 are schematic illustrations of example process control systems constructed in accordance with the teachings of this disclosure.

Because of the complexity of modern process control systems and the limitless number of process plant configurations, it can be difficult to detect all defects before a process control system fix, patch, upgrade, etc. is released. Such undetected defects may only become apparent after and/or when the process control system is operated in connection with an actual process plant. To alleviate the need to replace, modify, patch, update and/or upgrade their process control system(s), some customers have instead elected to isolate their process control system(s) from other device(s) and/or network(s). While such actions may reduce the potential for disruptions, it also prevents process engineers from taking advantage of the features and/or capabilities available in newer versions of a process control system.

In general, the example apparatus, methods, and articles of manufacture described herein may be used to test a new and/or updated process control system using process data collected from a customer's actual process plant using their existing process control system(s) before the new and/or updated process control system is used to control the customer's process plant. In particular, user inputs (e.g., received via graphical user interfaces), process inputs (e.g., received from field devices) and process outputs (e.g., sent to field devices) of a first process control system are captured while the first process control system operates within the customer's process plant. The captured inputs are used to stimulate and/or operate a second process control system while its process outputs are captured. That is, the captured inputs from the first process control system are applied to operate the second process control system rather than the second process control system operating in response to user inputs and/or inputs received from field devices.

Using the methods, apparatus and articles of manufacture described herein, it is not necessary to define and/or implement a model of the process plant in order to test the second process control system. Instead, the process outputs captured from the two process control systems may be compared to determine whether the second process control system operated as intended. Because the data was captured while the first process control system operated within the customer's process plant, if the captured process outputs match, then process engineers can have confidence that the second process control system will operate as intended in the customer's process plant. Due to limited precision (e.g., quantization of time and/or quantization numeric values), the captured process outputs may not match exactly but should match sufficiently to enable a determination that the second process control system operated as intended.

The second process control system may be the first process control system after a fix, patch, upgrade, etc. has been applied but before the first process control system begins controlling the process plant. Additionally or alternatively, the second process control system may be implemented in a different environment and/or a different physical location such as at an in-house test facility and/or at a test or training facility associated with the vendor of the process control systems. Further, the first and/or the second process control systems may be a simulation and/or model of a process control system.

In some examples, the captured inputs are also used to stimulate and/or operate a third process control system while its process outputs are captured. That is, the captured inputs from the first process control system are applied to operate each of the second and the third process control systems. The process outputs of the second and third process control systems can be compared to determine whether the third process control system operated as intended. For instance, if second process control system is identical to the first process control system, differing only in that the second process control system is operated separately from the customer's process plant, and the third process control system is the second process control after a fix, patch, upgrade, etc. has been applied, by comparing the process outputs of the second and third process control systems, then process engineers can have confidence that the updated process control system will operate as intended in the customer's process plant.

The data captured from the first process control system may, additionally or alternatively, be used to detect and/or identify one or more scenarios that may recur in the process plant. For example, instead of applying the captured inputs to a second process control system, the original inputs and outputs captured from the first process control system can be compared to additional inputs and outputs captured from the first process control system. The original and additional inputs and outputs can be compared to detect and/or identify recurring scenarios. For example, when the original and additional inputs and outputs match, possibly within some tolerance(s), an operator of the process control system can be notified that the scenario associated with the originally captured inputs and outputs has and/or is occurring within the process plant.

Further still, the examples described herein may be used to implement training systems. For example, the inputs and outputs captured from the first process control system can be used to operate the second process control system while a trainee watches the second process control system operate and/or operates the second process control system in response to the previously captured inputs. In the later instance, the trainee's inputs may be compared with the captured user inputs to determine whether the trainee responded appropriately and/or promptly.

FIG. 1 is a schematic illustration of an example process control system 100 that may be used to control all or any part(s) of, for example, a manufacturing process, a manufacturing system, a manufacturing plant and/or any other type of process plant. In the interest of brevity and clarity, throughout the following descriptions references will be made to the example process control system 100 of FIG. 1. However, the methods, apparatus and articles of manufacture described herein to test process control systems are applicable to other process control systems. The example process control system 100 of FIG. 1 includes one or more process controllers (two of which are designated at reference numerals 110 and 111), one or more operator stations (one of which is designated at reference numeral 115), and one or more work stations (two of which are designated at reference numerals 120 and 121). The example process controllers 110 and 111, the example operator station 115 and the example work stations 120 and 121 are communicatively coupled via a bus and/or local area network (LAN) 125, which is commonly referred to as an application control network (ACN).

The example operator station 115 of FIG. 1 allows a process plant operator to review and/or operate one or more operator display screens, graphical user interfaces and/or applications that enable the process plant operator to view process plant variables, view process plant states, view process plant conditions, view process plant alarms, and/or to provide user inputs such as those used to change process plant settings (e.g., set points and/or operating states, clear alarms, silence alarms, etc.). Such screens and/or applications are typically designed and/or implemented by process configuration engineers.

The example work stations 120 and 121 of FIG. 1 may be configured to implement any number and/or type(s) of application(s) and/or function(s). In the illustrated example of FIG. 1, the work station 120 is configured to perform primarily process control-related applications, while the example work station 121 is configured to perform primarily communication applications that enable the process control system 100 to communicate with other devices or systems using any desired communication media (e.g., wireless, hardwired, etc.) and protocols (e.g., HTTP, SOAP, etc.). For example, the example application station 121 may implement one or more information technology applications, user-interactive applications and/or communication applications. The work station 121 will be referred to hereafter as the application station 121. As described in more detail below, the example application station 121 of FIG. 1 includes and/or implements a test server TS that may be used to test a process control system such as any of example process control systems 100, 200 and 300 of FIGS. 1-3. An example manner of implementing the example test server TS is described below in connection with FIG. 4. Example processes that may be carried out by, for example, the example test server TS to test a process control system are described below in connection with FIGS. 5 and 6.

Figure 7:
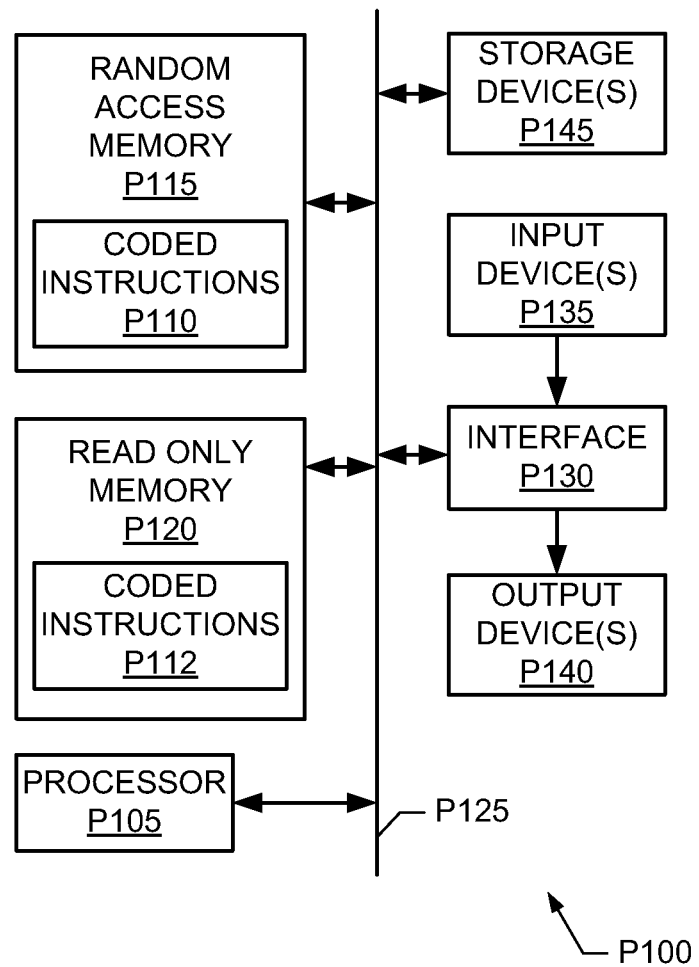
FIG. 7 is a schematic illustration of an example processor platform that may be used and/or programmed to carry out the example processes of FIGS. 5 and/or 6, and/or to implement any or all of the example test servers of FIGS. 1-4.

The example stations 115, 120 and 121 may be implemented using any suitable computing systems and/or processing systems such as the example processor platform P100 of FIG. 7. The stations 115, 120 and 121 could, for example, be implemented using single-processor and/or multi-processor computers.

The example LAN 125 of FIG. 1 may be implemented using any desired communication medium and protocol. For example, the LAN 125 may be based on a wired and/or wireless Ethernet communication scheme. However, any other suitable communication medium(s) and/or protocol(s) could be used. Further, although a single LAN 125 is illustrated in FIG. 1, more than one LAN and/or other alternative pieces of communication hardware may be used to provide redundant communication paths within the example process control system 100 of FIG. 1.

The example controller 110 of FIG. 1 is coupled to a plurality of smart field devices 130, 131 and 132 via a digital data bus 135 and an input/output (I/O) gateway 140. The smart field devices 130-132 may be Fieldbus compliant valves, actuators, sensors, etc., in which case, the smart field devices 130-132 communicate via the digital data bus 135 using the well-known Foundation Fieldbus protocol. Of course, other types of smart field devices and communication protocols could be used instead. For example, the smart field devices 130-132 could instead be Profibus and/or HART compliant devices that communicate via the data bus 135 using the well-known Profibus and HART communication protocols. Additional I/O devices, which are different, similar and/or identical to the I/O gateway 140, may be coupled to the controller 110 to enable additional groups of smart field devices, which may be Foundation Fieldbus devices, HART devices, etc., to communicate with the controller 110. In addition to the example smart field devices 130-132, one or more non-smart field devices 133 and 134 may be communicatively coupled to the example controller 110. The example non-smart field devices 133 and 134 of FIG. 1 may be, for example, conventional 4-20 milliamp (mA) or 0-10 volts direct current (VDC) devices that communicate with the controllers 110 and 111 via respective links. While not shown in FIG. 1, the example controller 111 is also coupled to similar and/or different field devices and/or I/O gateways.

The example controllers 110 and 111 of FIG. 1 may be, for example, a DeltaV™ controller and/or a DeltaV Characterization Module (Charms) I/O card sold by Fisher-Rosemount Systems, Inc., an Emerson Process Management company. However, any other controller(s) could be used. Further, while two controllers 110 and 111 are shown in FIG. 1, additional controllers of any desired type and/or combination of types could be coupled to the LAN 125. In any case, the example controllers 110 and 111 perform, carry out and/or implement one or more process control routines and/or modules associated with the process control system 100 that have been generated by a system engineer and/or other system operator using the operator station 115 and which have been downloaded to and/or instantiated in the controllers 110 and 111.

To configure the control components of the example process control system 100 (e.g., the example controllers 110 and 111, the example operator station 115, the example work stations 120 and 121, the example I/O gateway 140 and/or the example field devices 130-134), the example process control system 100 of FIG. 1 includes a process control system configuration subsystem 150. The example configuration subsystem 150 of FIG. 1 loads, configures, commissions and/or programs the actual (i.e., physical) process control components of the process control system 100 based on an operation database 155. The example configuration subsystem 150 and the example operation database 155 of FIG. 1 are a part of the DeltaV process control system sold by Fisher-Rosemount Systems, Inc., an Emerson Process Management company. The example operation database 155 of FIG. 1 may be generated, defined, specified and/or populated using other tools and/or interfaces (not shown) of the DeltaV process control system.

To capture, record and/or log user or operator inputs, the example operator station 115 of FIG. 1 includes an event chronicler EC. As a user interacts with the example operator station 115 to provide and/or change, for example, setpoints or process variables, start an application, open and/or close a graphical user interface, etc., the example event chronicler EC of FIG. 1 records and/or captures the user's inputs into an event log. The example event chronicler EC of FIG. 1 may be, for example, the DeltaV Event Chronicle sold by Fisher-Rosemount Systems, Inc., an Emerson Process Management company. As shown in FIG. 1, the example work station 120 and the example application station 121 may also implement an event chronicler EC having substantially similar functionality.

To capture, record and/or log process inputs and process control outputs, one or more of the example operator station 115, the example work station 120 and/or the example application station 121 include and/or implement a data historian DH. The example data historians DH of FIG. 1 capture and/or record process inputs received at the example controllers 110 and 111 into a data log. The data historians DH also record process control outputs generated by the example controllers 110 and 111 into the data log. The example data historians DH of FIG. 1 may be implemented by, for example, the DeltaV Continuous Historian sold by Fisher-Rosemount Systems, Inc., an Emerson Process Management company.

While in the illustrated example of FIG. 1, the event chroniclers EC and the data historians DH are used to capture inputs and outputs of the example process control system 100, additionally or alternatively, a redundant, duplicate and/or standby controller (not shown) could be used to capture the inputs and/or outputs. The redundant controller could be configured to synchronize its state to a monitored controller 110, 111 and to record data, commands and/or information sent to and/or sent by the monitored controller 110, 111. The recorded information could be subsequently retrieved from the redundant controller and used, as described below, by the example test server TS to test a process control system. The state of the redundant controller could also be used to initialize the state of an under-test process control system prior to stimulation with recorded user and process inputs. In some examples, the data captured by the redundant controller may be captured with less fidelity (e.g., be quantized) to reduce the amount of data that must be transferred between the monitored and redundant controllers. When captured process outputs are subsequently compared differences in initial state and data due to quantization may be taken into consideration. The redundant controller may capture the data while installed in a customer's process control system and subsequently moved to a laboratory for analysis, training, and/or testing another process control system.

To access user inputs, process inputs and/or process outputs captured by the example event chroniclers EC and/or the example data historians DH, the example application station 121 of FIG. 1 includes and/or implements an access server AS. The example access server AS of FIG. 1 accesses the logged user inputs, process inputs and process outputs using any number and/or type(s) of methods implemented in accordance with any past, present and/or future object linking and embedding (OLE) for process control (OPC) standard and/or specification. The example access server AS of FIG. 1 enables other elements of the process control system 100 such as the example test server TS to access logged user inputs, process inputs and/or process outputs. The example access server AS also enables the example test server TS to provide user inputs and/or process inputs to the controllers 110 and 111 to, for example, cause the example controllers 110 and 111 of FIG. 1 to operate in the absence of the field devices 130-134 and/or the I/O gateway 140, and/or even in the absence of a process plant. The example access server AS of FIG. 1 may be implemented by, for example, the DeltaV OPC History Server and/or the DeltaV OPC Events Server sold by Fisher-Rosemount Systems, Inc., an Emerson Process Management company.

Figure 2:
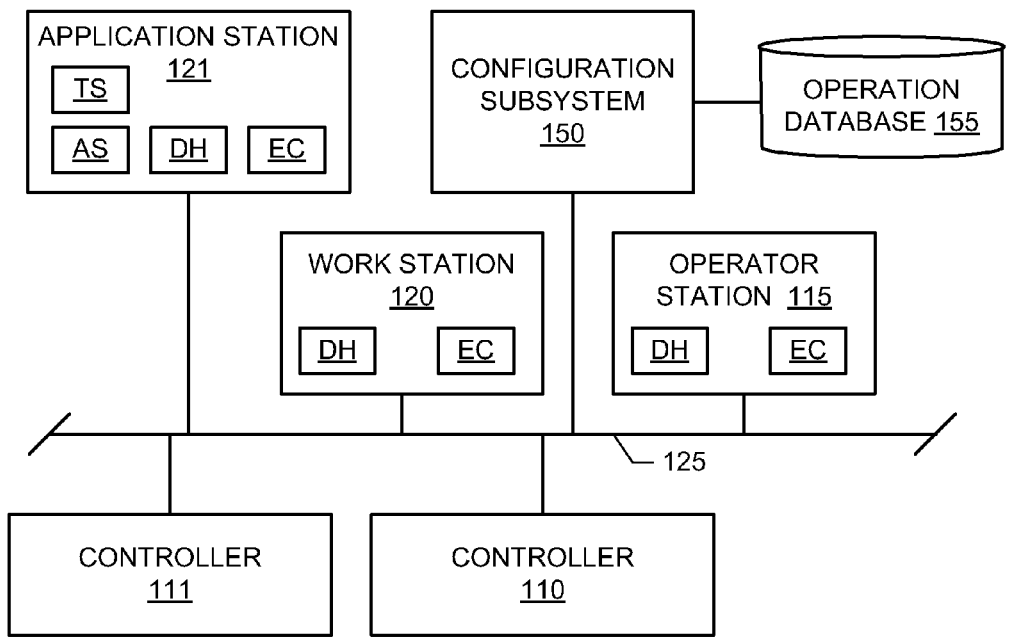
Figure 3:
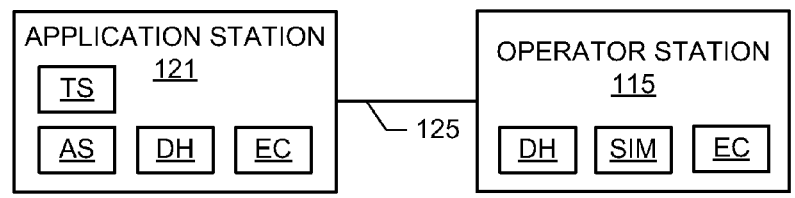

To test a process control system such as any of the example process control systems 100, 200 and 300 of FIGS. 1, 2 and 3, respectively, the example application station 121 of FIG. 1 includes the example test server TS. While the example process control system 100 of FIG. 1 operates, the example event chroniclers EC and the example data historians DH collect inputs and outputs of the controllers 110 and 111. The example test server TS of FIG. 1 obtains via the example access server AS the collected inputs and outputs for subsequent use in operating the example process control system 100 of FIG. 1 and/or any other process control systems such as those depicted in FIGS. 2 and 3. To test a process control system, the example test server TS stimulates and/or operates the under-test process control system using the recorded inputs and outputs. That is, the captured inputs are applied directly to the under-test process control system to operate the under-test process control system instead of the under-test process control system operating in response to user inputs and/or inputs received from the operator station 115, the field devices 130-134 and/or the I/O gateway 140. The test server TS applies the captured inputs to the under-test process control system via the access server AS.

While the example test server TS of FIG. 1 operates the under-test process control system, the event chroniclers EC and the data historians DH collect user inputs and process inputs and/or outputs. The example test server TS may compare the process outputs captured from the two process control systems to determine whether the second process control system operated as intended. Because the data was captured while the first process control system operated within the customer's process plant, if the captured process outputs match, then test server TS and/or a user of the test server TS can determine with confidence that the under-test process control system should operate as intended in a customer's process plant. Due to limited precision (e.g., quantization of time and/or numeric values), the captured process outputs may not match exactly but should sufficiently match to enable a determination that the under-test process control system operated as intended. For example, analog values may be considered as matching if there difference does not exceed a user-definable threshold, and/or digital values may be considered as matching if they occur with a user-definable window relative to each other.

FIG. 2 illustrates an example under-test process control system 200 that may be used to test the example process control system 100 of FIG. 1. Because many of the elements illustrated in FIG. 2 are identical to those discussed above in connection with FIG. 1, identical elements are designated with identical alpha-numeric references in FIGS. 1 and 2 and the reader is the referred to the descriptions provided above in connection with FIG. 1 for a description of identical elements.

In the illustrated example under-test process control system 200 of FIG. 2, the example controllers 110 and 111 have been logically and/or physically disconnected from the example field devices 130-134 and/or the I/O gateway 140. Accordingly, the example controllers 110 and 111 of FIG. 2 operate in response to previously captured process inputs and user inputs provided to the controllers 110 and 111 by the test server TS via the access server AS. As shown in FIG. 2, an actual process plant is not required to test the process control system 200. Further, no model of the process plant is required. Instead, previously captured inputs are played-back into the under-test process control system 200 and the controllers 110 and 111 compute process control outputs as if they were operating in an actual process control plant. The example test server TS applies the inputs to the process control system 200 regardless of the outputs computed by the process control system 200. Thus, if the originally captured inputs represent a stable operation of the process control system 100, the outputs of the process control system 200 should likewise be stable.

It should be apparent that the example process control system 200 of FIG. 2 may be tested even before the operation database 155 contains I/O references such as, for example, during an early stage of process engineering. In such examples, inputs and outputs captured from a similar plant and/or inputs designed, modified and/or intended to test the process control system 200 may be applied by the example test server TS.

Because the example controllers 110 and 111 do not have any connected field devices 130-134 and/or I/O gateway 140, the example operation database 155 of the process control system 200 needs to be modified to replace real I/O channel assignment information with logical and/or simulation input parameters. The replacement of I/O channel assignment information may be carried out using the DeltaV SimulatePro application sold by Fisher-Rosemount Systems, Inc., an Emerson Process Management company.

In some examples, a counter module (not shown) is added to the operation database 155 to enable sampling of the operation of the under-test process control system 200 at desired intervals and/or at a desired rate. An example sampling rate is one second, although any other rate supportable by the data transfer capabilities of the access server AS may be implemented. In some examples, any process control routines that operate at a rate higher than the sampling rate are also modified to operate at the sampling rate. Alternatively, buffered reads and/or buffered writes may be implemented by the access server AS to enable process control routines to operate at rates exceeding the sampling rate.

The example process control system 200 of FIG. 1 may be, for example, the process control system 100 after a fix, patch, upgrade, etc. has been applied but before the process control system 200 begins controlling the process plant. Additionally or alternatively, the process control system 200 may be implemented in a different environment and/or a different physical location such as at in-house test facility and/or at a test or training facility associated with the vendor of the process control system 200. Further, as shown in FIG. 3, a simulation and/or model of a process control system may be used to implement the example process control system 100, and/or a simulation and/or model of a process plant may be used to test the example process control system 100.

FIG. 3 illustrates another example under-test process control system 300 that may be used to test the example process control system 100 of FIG. 1. Because many of the elements illustrated in FIG. 3 are identical to those discussed above in connection with FIG. 1, identical elements are designated with identical alpha-numeric references in FIGS. 1 and 3 and the reader is the referred to the descriptions provided above in connection with FIG. 1 for a description of identical elements.

In the illustrated example under-test process control system 300 of FIG. 3, the example controllers 110 and 111 are replaced by, modeled by and/or simulated by a simulator SIM. In the example process control system 300 of FIG. 3, the example simulator SIM is implemented on the example operator station 115. However, the simulator SIM may alternatively be implemented on the example application station 121, on the example work station 120 and/or on any other processing or computing system. The example simulator SIM of FIG. 3 may be implemented using the DeltaV SimulatePro application sold by Fisher-Rosemount Systems, Inc., an Emerson Process Management company.

While FIGS. 1, 2 and 3 illustrate example process control systems 100, 200 and 300, respectively, within which the example apparatus, methods, and articles of manufacture to test process control systems may be advantageously employed, persons of ordinary skill in the art will readily appreciate that the apparatus, methods, and articles of manufacture described herein may, if desired, be advantageously employed in other process plants and/or process control systems of greater or less complexity (e.g., having more than two controllers, across more than one geographic location, etc.) than the illustrated examples of FIGS. 1-3. Moreover, while not shown in FIGS. 1-3 for clarity of illustration, there may be any number and/or type(s) of additional and/or alternative devices, components and/or systems included in a process plant and/or a process control system. For example, a process plant and/or a process control system may include and/or implement a firewall, a switch, a router, a hub, a power supply, and/or any other devices managed and/or controllable by a process control system, such as the DeltaV process control system sold by Fisher-Rosemount Systems, Inc., an Emerson Process Management company.

While example process control systems 100, 200 and 300 have been illustrated in FIGS. 1, 2 and 3, respectively, one or more of the interfaces, data structures, elements, processes and/or devices illustrated in FIGS. 1, 2 and 3 may be combined, divided, re-arranged, omitted, eliminated and/or implemented in any other way. Further, the example controllers 110, 111, the example stations 115, 120 and 121, the example field devices 130-134, the example I/O gateway 140, the example configuration subsystem 150, the example event chroniclers EC, the example data historians DH, the example access server AS and/or the example test server TS may be implemented by hardware, software, firmware and/or any combination of hardware, software and/or firmware. Thus, for example, any of the example controllers 110, 111, the example stations 115, 120 and 121, the example field devices 130-134, the example I/O gateway 140, the example configuration subsystem 150, the example event chroniclers EC, the example data historians DH, the example access server AS and/or the example test server TS be implemented by the example processor platform P100 of FIG. 7 and/or one or more circuit(s), programmable processor(s), application-specific integrated circuit(s) (ASIC(s)), programmable logic device(s) (PLD(s)), field-programmable logic device(s) (FPLD(s)), field-programmable gate array(s) (FPGA(s)), fuses, etc. When any apparatus claim of this patent incorporating one or more of these elements is read to cover a purely software and/or firmware implementation, at least one of the example controllers 110, 111, the example stations 115, 120 and 121, the example field devices 130-134, the example I/O gateway 140, the example configuration subsystem 150, the example event chroniclers EC, the example data historians DH, the example access server AS and/or the example test server TS hereby expressly defined to include a tangible article of manufacture such as a tangible computer-readable medium storing the firmware and/or software. Further still, the example process control systems 100, 200 and/or 300 may include interfaces, data structures, elements, processes and/or devices instead of, or in addition to, those illustrated in FIGS. 1, 2 and/or 3, and/or may include more than one of any or all of the illustrated interfaces, data structures, elements, processes and/or devices.

As used herein, the term tangible computer-readable medium is expressly defined to include any type of computer-readable medium and to expressly exclude propagating signals. As used herein, the term non-transitory computer-readable medium is expressly defined to include any type of computer-readable medium and to exclude propagating signals. Example tangible and/or non-transitory computer-readable media include a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 7.

Figure 4:
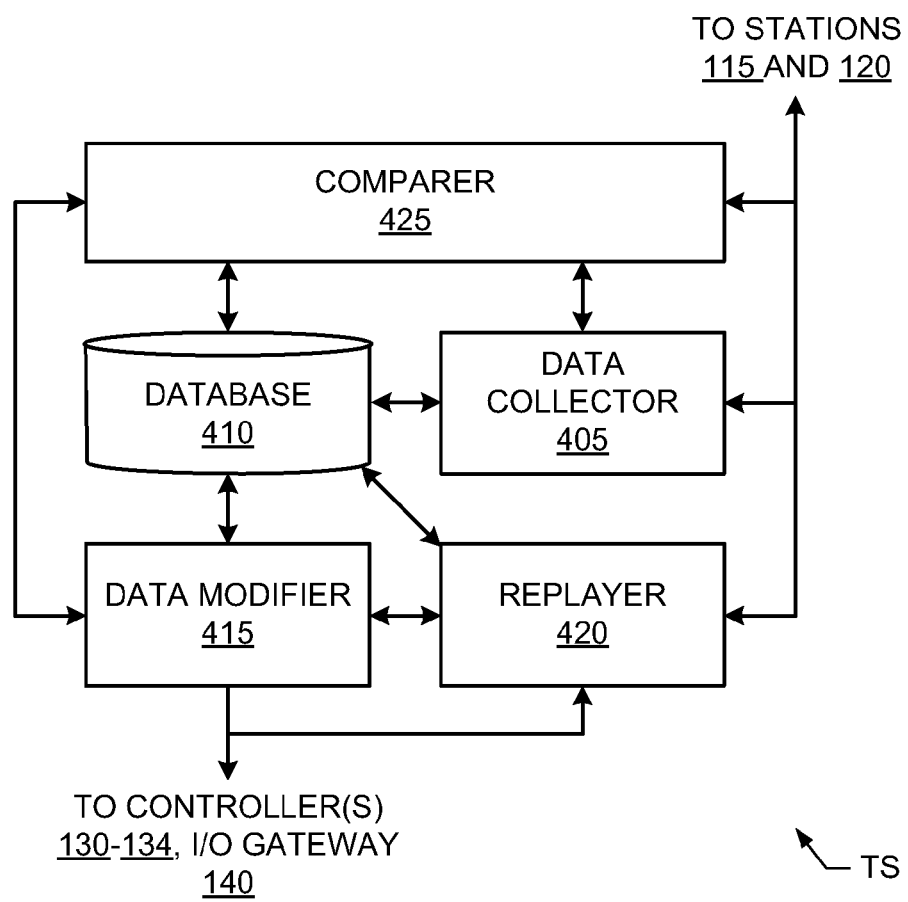
FIG. 4 illustrates an example manner of implementing the example test server of FIGS. 1-3.

FIG. 4 illustrates an example manner of implementing any of the example test servers TS of FIGS. 1, 2 and 3. To collect data, the example test server TS of FIG. 4 includes a data collector 405. The example data collector 405 of FIG. 4 interacts with the example access server AS (FIGS. 1-3) to obtain user inputs, process inputs and/or process outputs from a process control system. The example data collector 405 stores the captured inputs and outputs in a database 410 using any number and/or type(s) of data structure(s), file(s) and/or file format(s). In some examples, the data collector 405 interacts with the example access server AS to obtain the captured inputs and outputs in Microsoft® Excel® format. The example database 410 may be stored on any number and/or type(s) of volatile and/or non-volatile storage device(s), memory(-ies) and/or memory device(s).

To generate data suitable for stimulating and/or operating a process control system, the example test server TS includes a data modifier 415. The example data modifier 415 combines user input information collected by the event chroniclers EC with process inputs collected by the data historians DH into a time-indexed data structure with each entry of the data structure corresponding to a sampling interval. The generated time-indexed data structure may be stored in the example database 410. In some examples, Microsoft Excel is used to implement the example data modifier 415 and a Microsoft Excel file is used to implement the time-indexed data structure, however, any other data structure(s) may be used.

Some inputs captured by the data historians DH may not be in the same format in which they were received by the controllers 110 and 111. For example, an analog input (AI) block of a proportional integral derivative (PID) control loop might scale or convert a process variable such as pressure into a value representative of a tank level. In such instances, the example data modifier 415 of FIG. 4 scales the captured process input(s) so that that scaled process input(s) represent the original input. For example, a tank level value could be scaled to represent a pressure value. In some examples, scaling of the captured process inputs is implemented using a bulk editing feature of an application such as Microsoft Excel. For example, scaling data may be obtained from the DeltaV configuration 155 and stored in a Microsoft Excel file. Machine-accessible instructions implemented, for example, as Microsoft Visual Basic (VBA) code may be used to carry out the scaling of the captured process inputs.

Additionally or alternatively, some captured process inputs may be represented by "named sets." For example, a value of 1 may represent "open" or "closed" depending on whether the associated valve is "normally open" or "normally closed." In such instances, the example data modifier 415 of FIG. 4 replaces the named set text (e.g., "closed") captured by the event chroniclers EC and/or the data historians DH with the corresponding numeric value (e.g., "1"). In some examples, the replacement of named set text with numeric values is implemented using a bulk editing feature of an application such as Microsoft Excel. The associations of named set text to numeric values may be obtained by, for example, exporting named set information from the DeltaV Explorer sold by Fisher-Rosemount Systems, Inc., an Emerson Process Management company into, for example, a Microsoft Excel file. Machine-accessible instructions implemented, for example, as Microsoft Visual Basic (VBA) code may be used to replace named set text with numeric values.

In some examples, to reduce the amount of storage required, the example data modifier 415 condenses the time-indexed data structure. For example, it is not uncommon for data captured from a real process plant to have time intervals where no user inputs occur and/or no process inputs change. The example data modifier 415 of FIG. 4 replaces sequential entries where changes occurred with a single entry that represents a count of the sequential entries. In some examples, only sequences of unchanged inputs having lengths that exceed a user definable threshold are replaced.

To stimulate and/or operate a process control system, the example test server TS of FIG. 4 includes a replayer 420. The example replayer 420 of FIG. 4 sends each input entry of the time-indexed data structure generated by the data modifier 415 to the respective logical and/or simulated I/O port(s) via the example access server AS. The inputs are provided at the timestamps associated the input entries. While the example replayer 420 of FIG. 4 stimulates the process control system, the example event chroniclers EC and the data historians DH collect user inputs, process inputs and process outputs.

To determine whether a process control system operated as intended, the example test server TS of FIG. 4 includes a comparer 425. The example comparer 425 of FIG. 4 compares the originally captured process outputs with the process outputs captured while the replayer 420 stimulates the process control system to, for example, determine whether an under-test process control system operated as intended. Due to limited precision (e.g., quantization of time and/or numeric values), the captured process outputs may not match exactly and, thus, the comparer 425 uses one or more tolerances when comparing process output values.

Additionally or alternatively, the comparer 425 may be used to detect and/or identify one or more scenarios that may recur in a process plant. For example, instead of the replayer 420 applying captured inputs to a process control system, the comparer 425 can compare previously captured inputs and outputs to additional captured inputs and outputs captured to detect and/or identify recurring scenarios. For example, when the original and additional inputs and outputs match, possibly within some tolerance(s), an operator of the process control system can be notified that the scenario associated with the originally captured inputs and outputs has and/or is occurring within the process plant.

Further still, the comparer 425 may be used to implement training systems. For example, the inputs and outputs captured from a first process control system can be used to operate a second process control system while a trainee watches the second process control system operate and/or operates the second process control system in response to the previously captured outputs. In the later instance, the comparer 425 compares the trainee's inputs with the captured user inputs to determine whether the trainee responded appropriately and/or promptly.

While an example manner of implementing the example test servers TS of FIGS. 1, 2 and/or 3 has been illustrated in FIG. 4, one or more of the elements, processes and/or devices illustrated in FIG. 4 may be combined, divided, re-arranged, omitted, eliminated and/or implemented in any other way. Further, the example data collector 405, the example database 410, the example data modifier 415, the example replayer 420, the example comparer 425 and/or, more generally, the example test server TS of FIG. 4 may be implemented by hardware, software, firmware and/or any combination of hardware, software and/or firmware. Thus, for example, any of the example data collector 405, the example database 410, the example data modifier 415, the example replayer 420, the example comparer 425 and/or, more generally, the example test server TS could be implemented by the example process platform P100 of FIG. 7 and/or one or more circuit(s), programmable processor(s), ASIC(s), PLD(s), FPLD(s), FPGA (s), fuses, etc. When any apparatus claim of this patent incorporating one or more of these elements is read to cover a purely software and/or firmware implementation, at least one of the example data collector 405, the example database 410, the example data modifier 415, the example replayer 420, the example comparer 425 and/or, more generally, the example test server TS are hereby expressly defined to include a tangible article of manufacture such as a tangible computer-readable medium storing the firmware and/or software. Further still, the example test server TS of FIG. 4 may include one or more elements, processes and/or devices in addition to, or instead of, those illustrated in FIG. 4, and/or may include more than one of any or all of the illustrated elements, processes and devices.

Figure 5:
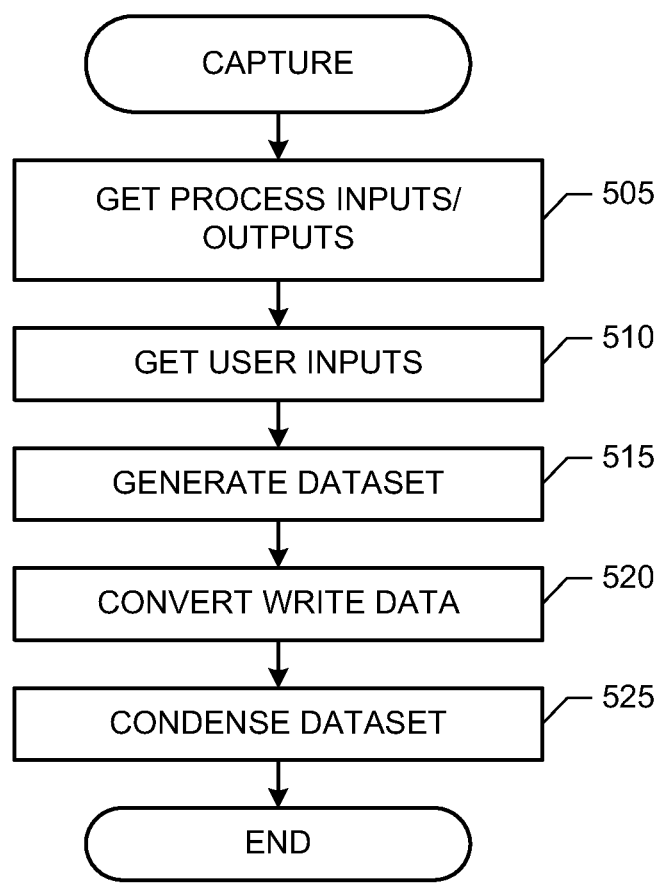
FIGS. 5 and 6 are flowcharts representative of example processes that may be carried out to implement any or all of the example test servers of FIGS. 1-4, and/or to test process control systems.
Figure 6:
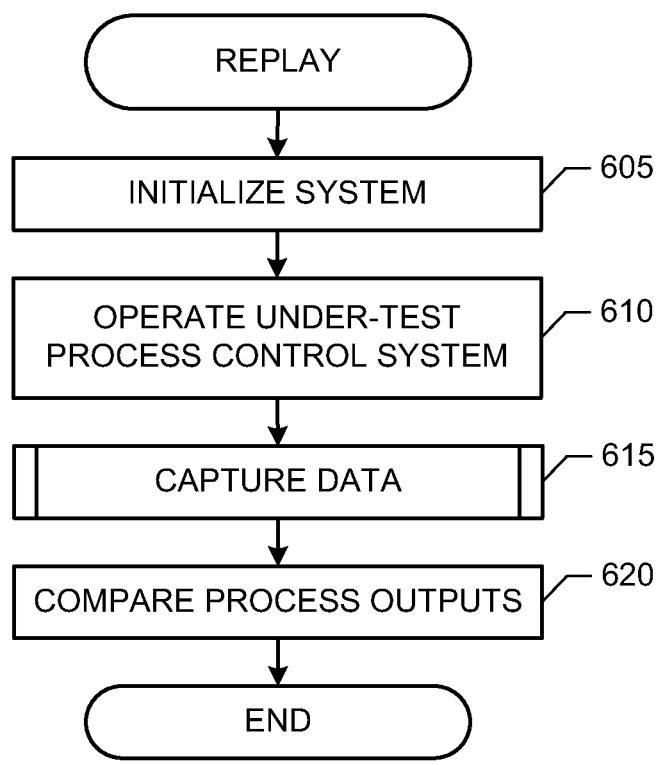

FIGS. 5 and 6 are flowcharts representative of example processes that may be carried out to implement any or all of the example test servers TS of FIGS. 1, 2, 3 and/or 4. A processor, a controller and/or any other suitable processing device may be used, configured and/or programmed to carry out the example processes of FIGS. 5 and/or 6. For example, the example processes of FIGS. 5 and 6 may be embodied in coded or machine-readable instructions stored on a tangible computer-readable medium. Machine-readable instructions comprise, for example, instructions that cause a processor, a computer and/or a machine having a processor to perform one or more particular processes. Alternatively, some or all of the example processes of FIGS. 5 and/or 6 may be implemented using any combination(s) of ASIC(s), PLD(s), FPLD(s), FPGA(s), discrete logic, hardware, firmware, etc. Also, some or all of the example processes of FIGS. 5 and/or 6 may be implemented manually or as any combination of any of the foregoing techniques, for example, any combination of firmware, software, discrete logic and/or hardware. Further, many other methods of implementing the example operations of FIGS. 5 and/or 6 may be employed. For example, the order of execution of the blocks may be changed, and/or one or more of the blocks described may be changed, eliminated, subdivided, or combined. Additionally, the blocks of any or all of the example processes of FIGS. 5 and/or 6 may be carried out sequentially and/or carried out in parallel by, for example, separate processing threads, processors, devices, discrete logic, circuits, etc.

The example process of FIG. 5 may be carried out to generate data for use in testing a process control system. The example process of FIG. 5 begins with the example data collector 405 obtaining process inputs and outputs via the example access server AS (block 505), and obtaining user inputs via the example access server AS (block 510). The example data collector 405 stores the obtained data in the example database 410.

The example data modifier 415 generates an initial time-index dataset from the data obtained by the data collector 405 (block 515). The data modifier 415, as needed, scales any of the process inputs values and/or replaces named set text with numeric values (block 520). The data modifier 415 condenses the time-indexed dataset to remove entries that do not represent changed inputs (block 525). The condensed time-indexed dataset is stored in the database 410, and control exits from the example process of FIG. 5.

The example process of FIG. 6 may be carried out to test a process control system. The example process of FIG. 6 begins with the example test server TS initialize the state of the under-test process control system using for, a download in DeltaV Explorer or a restore in DeltaV SimulatePro (block 605). The example replayer 420 executes, stimulates and/or operates the under-test process control system by sending the inputs values contained in the condensed time-indexed dataset to the process control system via the access server AS (block 610).

The data collector 405 obtains user inputs, process inputs and process outputs captured by the event chroniclers EC and the data historians DH during the execution of block 610

(block 615). The data collector 405 may, for example, obtain the data by carrying out the example process of FIG. 5. The example comparer 425 compares the original and the additionally collected process outputs to determine whether the under-test process control system operated as intended (block 620). Control then exits from the example process of FIG. 6.

In some examples, the example process of FIG. 6 may be carried out more than once. For example, the process of FIG. 6 may be carried out a first time to verify the intended operation of a second process control plant that only differs from a first process control plant in that the second process control system is operated separately from the customer's process plant. The process of FIG. 6 could be carried out a second time to verify the intended operation of a third process control system that is the second process control after a fix, patch, upgrade, etc. has been applied.

FIG. 7 is a block diagram of an example processor platform P100 that may be used and/or programmed to implement the test servers TS, the example operator station 115, the example work station 120, the example application station 121 and/or to execute any or all of the example machine-accessible instructions and/or processes described herein. One or more general-purpose processors, processor cores, microcontrollers, etc. may be used to implement the processor platform P100. The processor platform P100 can be, for example, a server, a personal computer, an embedded controller, and/or any other type of computing device.

The processor platform P100 of the instant example includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may be programmed to carry out the example processes of FIGS. 5 and 6. Thus, the coded instructions P110, P112 may represent the example processes of FIGS. 5 and/or 6.

The processor P105 is in communication with the main memory including a ROM P110 and the RAM P115 via a bus P125. The RAM P115 may be implemented by Synchronous Dynamic Random Access Memory (SDRAM), Dynamic Random Access Memory (DRAM), RAMBUS Dynamic Random Access Memory (RDRAM) and/or any other type of RAM device. The ROM P110 may be implemented by flash memory and/or any other desired type of memory device. Access to the memory P115 and the memory P120 may be controlled by a memory controller. The example memory P115 may be used to, for example, store the example database 410.

The processor platform P100 includes an interface circuit P130. Any type of interface standard, such as an external memory interface, serial port, general-purpose input/output, as an Ethernet interface, a universal serial bus (USB), and/or a PCI express interface, etc., may implement the interface circuit P130.

One or more input devices P135 may be connected to the interface circuit P130. The input device(s) P135 can be implemented by, for example, a keyboard, a mouse, a touch screen, a track-pad, a trackball, isopoint and/or a voice recognition system. One or more output devices P140 are also connected to the interface circuit 1020. The output devices P140 can be implemented, for example, by display devices (e.g., a liquid crystal display, a cathode ray tube display (CRT), a printer and/or speakers). The interface circuit P130 may, thus, include a graphics driver card. The input device(s) P135 and the output device(s) P136 may, additionally or alternatively, be used to implement the example data collector 405.

The interface circuit P130 may also includes a communication device such as a modem, transceiver or network interface card to facilitate exchange of data with external computers via a network (e.g., the LAN 125).

In some examples, the processor platform P100 also includes one or more mass storage devices P145 to storing software and data. Examples of such mass storage devices P145 include a floppy disk drive, a hard disk drive, a solid-state hard disk drive, a CD drive, a DVD drive and/or any other solid-state, magnetic and/or optical storage device. The mass storage device P145 may implement the example operation database 155 and/or the example database 410.

The coded instructions described herein may be stored in the mass storage device P145, in the RAM P115, in the ROM P120, and/or on a removable storage medium such as a CD or a DVD.

From the foregoing, it will appreciate that the above disclosed methods, apparatus and articles of manufacture to test process control systems. Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
obtaining user inputs, process inputs, and first process outputs of a first process control system connected to first field devices;
providing the user inputs and the process inputs to a second process control system not connected to the first field devices and not connected to any other field devices, the user inputs and the process inputs to test the second process control system;
obtaining second process outputs of the second process control system operated with the user inputs and the process inputs; and
comparing, using a processor, the first and second process outputs to determine whether the second process control system is implemented as intended.

2. A method as defined in claim 1, further comprising:
providing the user inputs and the process inputs to a third process control system not connected to the first field devices and not connected to any other field devices, the user inputs and the process inputs to test the third process control system;
obtaining third process outputs of the third process control system operated with the user inputs and the process inputs; and
comparing the second and third process outputs to determine whether the third process control system is implemented as intended.

3. A method as defined in claim 1, wherein comparing the first and second process outputs to determine whether the second process control system is implemented as intended comprises:
computing a difference between a first of the first process outputs and a first of the second process outputs; and
comparing the difference to a threshold.

4. A method as defined in claim 3, wherein the threshold represents at least one of a percentage of the first of the first process outputs or a time stamp difference.

5. A method as defined in claim 1, further comprising capturing the user inputs, the process inputs and the first process outputs while the first process control system executes.

6. A method as defined in claim 1, wherein the first process control system is implemented at a process plant and the second process control system is implemented at a test facility.

7. A method as defined in claim 1, wherein the second process control system comprises a training system.

8. A method as defined in claim 1, wherein the second process control system comprises the first process control system, and the second process control system implements a different software version than the first process control system.

9. A method as defined in claim 1, further comprising:
combining the user inputs and the process inputs into a dataset, the dataset being indexed by time; and
scaling a first of the process inputs to compensate for a modification of the first of the process inputs by the first process control system.

10. A method as defined in claim 9, further comprising replacing a second of the process inputs by a numeric value when the second of the process inputs comprises text.

11. A method as defined in claim 9, further comprising condensing the dataset to remove an element of the dataset corresponding to none of the user inputs, none of the process inputs and none of the first process outputs.

12. An apparatus comprising:
a data collector to obtain user inputs, process inputs, and first process outputs of a first process control system connected to first field devices and to obtain second process outputs of a second process control system not connected to the first field devices and not connected to any other field devices;
a replayer to provide the user inputs and the process inputs to the second process control system to test the second process control system; and
a comparer to compare the first and second process outputs to determine whether the second process control system operated as intended, at least one of the data collector, the replayer, or the comparer comprising a logic circuit.

13. An apparatus as defined in claim 12, further comprising:
an event chronicler to capture the user inputs while the first process control system operates; and
a data historian to capture the process inputs and the first process outputs while the first process control system operates.

14. An apparatus as defined in claim 12, wherein the first process control system is operated within a process plant.

15. An apparatus as defined in claim 12, wherein the second process control system comprises the first process control system, and the second process control system implements a different software version than the first process control system.

16. An apparatus as defined in claim 12, wherein the data collector is to combine the user inputs and the process inputs into a dataset, the dataset being indexed by time, and further comprising a data modifier to scale a first of the process inputs to compensate for a modification of the first of the process inputs by the first process control system.

17. An apparatus as defined in claim 16, wherein the data modifier is to replace a second of the process inputs by a numeric value when the second of the process inputs comprises text.

18. A tangible machine-readable storage medium comprising instructions that, when executed, cause a processor to at least:
obtain user inputs, process inputs, and first process outputs of a first process control system connected to first field devices;
provide the user inputs and the process inputs to a second process control system not connected to the first field devices, the user inputs and the process inputs to test the second process control system, the second process control system not receiving any other process inputs;
obtain second process outputs of the second process control system operated with the user inputs and the process inputs;
provide the user inputs and the process inputs to a third process control system not connected to the first field devices, the user inputs and the process inputs to operate test the third process control system, the third process control system not receiving any other process inputs;
obtain third process outputs of the third process control system operated with the user inputs and the process inputs; and
compare the second and third process outputs to determine whether the third process control system is implemented as intended.

19. A tangible machine-readable storage medium as defined in claim 18, wherein the first process control system is implemented at a process plant, and the second and third process control systems are implemented at a test facility.

20. A tangible machine-readable storage medium as defined in claim 18, wherein the second process control system comprises the first process control system, and the third process control system implements a different software version than the second process control system.

* * * * *

UNITED STATES PATENT AND TRADEMARK OFFICE
CERTIFICATE OF CORRECTION

PATENT NO. : 8,442,663 B2  
APPLICATION NO. : 12/861515  
DATED : May 14, 2013  
INVENTOR(S) : Tom Aneweer, Dirk Thiele and Noel Bell Page 1 of 1

It is certified that error appears in the above-identified patent and that said Letters Patent is hereby corrected as shown below:

In the Claims:

Column 16, line 30: after "the process inputs to", delete "operate"

Signed and Sealed this  
Thirty-first Day of December, 2013

Margaret A. Focarino  
*Commissioner for Patents of the United States Patent and Trademark Office*